United States Patent
Dovek et al.

(10) Patent No.: US 7,116,531 B2
(45) Date of Patent: Oct. 3, 2006

(54) LEAD OVERLAY BOTTOM SPIN VALVE WITH IMPROVED SIDE READING

(75) Inventors: Moris M. Dovek, San Jose, CA (US); Tai Min, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 62 days.

(21) Appl. No.: 10/915,272

(22) Filed: Aug. 10, 2004

(65) Prior Publication Data

US 2005/0007706 A1 Jan. 13, 2005

Related U.S. Application Data

(62) Division of application No. 10/093,107, filed on Mar. 7, 2002, now Pat. No. 6,779,248.

(51) Int. Cl.
*G11B 5/39* (2006.01)

(52) U.S. Cl. ............... 360/324.1; 360/322; 360/324.11

(58) Field of Classification Search ............... 360/322, 360/324.12
See application file for complete search history.

(56) References Cited

U.S. PATENT DOCUMENTS

| | | | |
|---|---|---|---|
| 4,101,311 A * | 7/1978 | Aonuma et al. ............ 428/412 |
| 6,219,208 B1 | 4/2001 | Gill ........................ 360/324.1 |
| 6,221,172 B1 | 4/2001 | Saito et al. ................. 148/108 |
| 6,222,707 B1 | 4/2001 | Huai et al. ............... 360/324.1 |
| 6,262,869 B1 * | 7/2001 | Lin et al. ............... 360/324.11 |
| 6,266,218 B1 * | 7/2001 | Carey et al. ........... 360/324.12 |
| 6,275,362 B1 | 8/2001 | Pinarbasi ............... 360/324.12 |
| 6,292,335 B1 | 9/2001 | Gill ........................ 360/324.11 |
| 6,493,194 B1 * | 12/2002 | Sakaguchi et al. .......... 360/322 |
| 6,545,848 B1 * | 4/2003 | Terunuma .............. 360/324.12 |
| 6,570,745 B1 * | 5/2003 | Gill ........................ 360/324.12 |
| 6,636,397 B1 * | 10/2003 | Gill ........................ 360/324.12 |
| 6,760,966 B1 * | 7/2004 | Wang et al. ............. 29/603.14 |
| 6,770,382 B1 * | 8/2004 | Chang et al. ............. 428/811.3 |
| 6,822,836 B1 * | 11/2004 | Gill ........................ 360/324.12 |
| 6,870,715 B1 * | 3/2005 | Umetsu .................. 360/324.12 |
| 6,954,341 B1 * | 10/2005 | Kamata et al. .............. 360/322 |
| 2003/0179507 A1 * | 9/2003 | Freitag et al. .............. 360/322 |
| 2003/0179512 A1 * | 9/2003 | Ju et al. ................. 360/324.11 |
| 2004/0174640 A1 * | 9/2004 | Morinaga et al. ....... 360/324.12 |
| 2005/0018366 A1 * | 1/2005 | Sbiaa et al. ............ 360/324.11 |

FOREIGN PATENT DOCUMENTS

JP 9-161230 A * 6/1997

* cited by examiner

*Primary Examiner*—Jefferson Evans
(74) *Attorney, Agent, or Firm*—Saile Ackerman LLC; Stephen B. Ackerman

(57) ABSTRACT

In bottom spin valves of the lead overlay type the longitudinal bias field that stabilizes the device tends to fall off well before the gap is reached. This problem has been overcome by inserting an additional antiferromagnetic layer between the hard bias plugs and the overlaid leads. This additional antiferromagnetic layer and the lead layer are etched in the same operation to define the read gap, eliminating the possibility of misalignment between them. The extra antiferromagnetic layer is also longitudinally biased so there is no falloff in bias strength before the edge of the gap is reached. A process for manufacturing the device is also described.

11 Claims, 1 Drawing Sheet

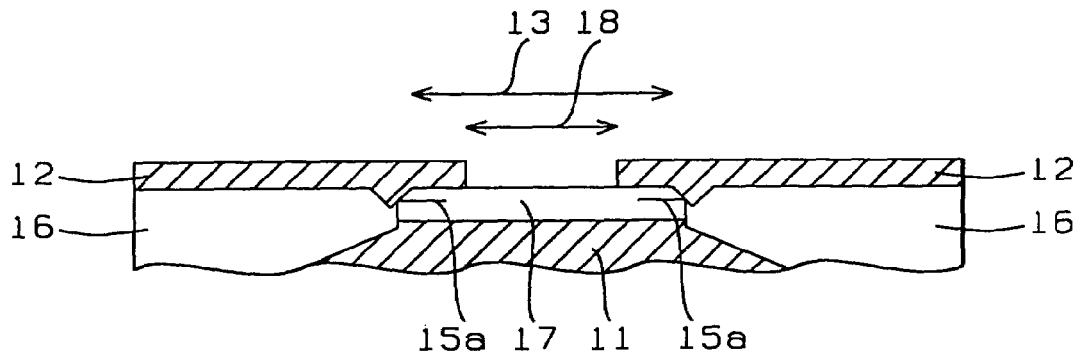
*FIG. 1 – Prior Art*
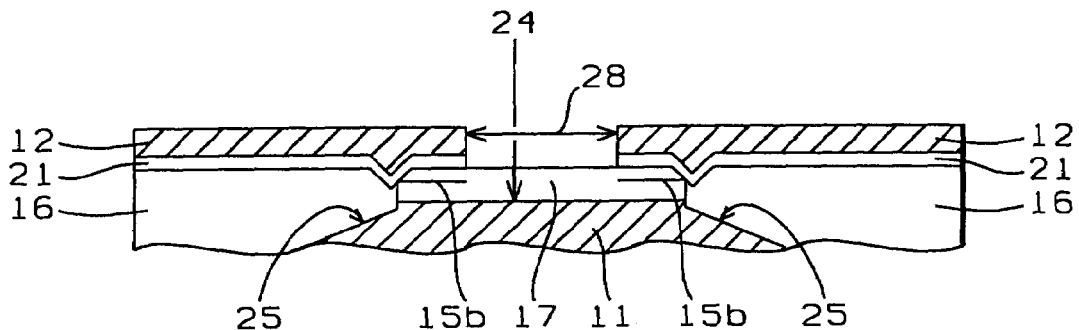
*FIG. 2*
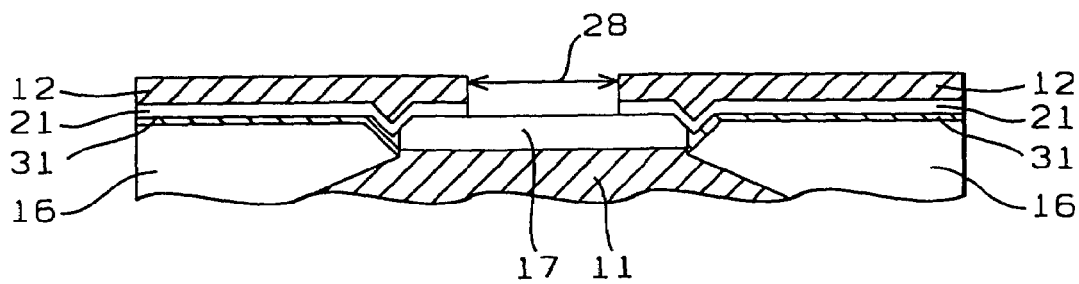
*FIG. 3*

LEAD OVERLAY BOTTOM SPIN VALVE WITH IMPROVED SIDE READING

This is a division of patent application Ser. No. 10/093,107, filing date Mar. 7, 2002, now U.S. Pat No. 6,779,248, Lead Overlay Bottom Spin Valve With Improved Side Reading, assigned to the same assignee as the present invention, which is herein incorporated by reference in its entirety.

FIELD OF THE INVENTION

The invention relates to the general field of read heads for magnetic disk systems with particular reference to the problem of controlling width of area read.

BACKGROUND OF THE INVENTION

The principle governing the operation of the read sensor in a magnetic disk storage device is the change of resistivity of certain materials in the presence of a magnetic field (magneto-resistance). Magneto-resistance can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of what is termed a top spin valve are, starting at the lowest level, a free magnetic layer, a non-magnetic spacer layer, a magnetically pinned layer, and a topmost pinning layer. Inverted structures in which the free layer is at the top are also possible (and are termed bottom spin valves). Only the lowest layer of a bottom spin valve is seen in FIG. 1—antiferromagnetic layer 11.

Although the layers enumerated above are all that is needed to produce the GMR effect, additional problems remain. In particular, there are certain noise effects associated with such a structure. As first shown by Barkhausen in 1919, magnetization in a layer can be irregular because of reversible breaking of magnetic domain walls, leading to the phenomenon of Barkhausen noise. The solution to this problem has been to provide operating conditions conducive to single-domain films for MR sensor and to ensure that the domain configuration remains unperturbed after processing and fabrication steps as well as under normal operation. This is most commonly accomplished by giving the structure a permanent longitudinal bias provided, in this instance, by two opposing layer 16 which are separated by gap 13 (FIG. 1). Examples of hard bias materials include Cr/CoPt or Cr/CoCrPt (where Cr is 0–200 Å), CoPt or CoCrPt (100–500 Å). Also seen in FIG. 1 is capping layer of 17 of Ta or Ru with a thickness of 1–30 Å.

As track density requirements for disk drives have grown more aggressive, GMR devices have been pushed to narrower track widths to match the track pitch of the drive and to thinner free layers to maintain high output in spite of the reduction in track width. Narrower track widths degrade stability as the device aspect ratio starts suffering. Thinner free layers have traditionally degraded stability and increased the asymmetry distribution across the slider population. The thicker hard-bias that is typically used to overcome stability concerns associated with the junction also results in amplitude loss due to the field originating from the hard bias structure. Side reading, which is attributable to any deviation of the head microtrack profile from a square, also gets worse with narrower track widths One approach that has been developed by the industry to overcome some of these stability concerns has been to use the lead overlay design shown in FIG. 1. In this design, track width is defined by the separation 18 of conductor leads 12 rather than by the hard bias separation 13. The lead overlay design moves the track edges, which are in part the cause of the instabilities, away from the current carrying region. Furthermore, the device has a more favorable aspect ratio, further enhancing stability. One remaining concern with such a device is whether or not it improves side reading. Although there is no substantial current in the area under the leads (overlap region), the region is still magnetically active and may transmit flux to the center of the device. The field due to the hard bias plugs gradually decays starting from the hard bias edge reaching a minimum at track center.

The two lines marked as 15a that extend under the leads a short distance from the bias plugs 16 represent the dead zone which is the magnetically inactive region between the wider physical width and the narrower magnetic width. Because of improper scaling (very high track density relative to linear density), the dead zone has become negative. i.e. the physical width has become narrower than the magnetic width.

A routine search of the prior art was performed with the following references of interest being found:

In U.S. Pat. No. 6,275,362, Pinarbasi shows a bottom SV process. In U.S. Pat. No. 6,292,335B1, Gill disclose a bottom SV process without a hard bias while in U.S. Pat. No. 6,222,707B1, Huai et al. reveal a related bottom SV process. U.S. Pat. No. 6,221,172B1 (Saito et al.) and U.S. Pat. No. 6,219,208B1 (Gill) are related SV MR patents.

SUMMARY OF THE INVENTION

It has been an object of at least one embodiment of the present invention to provide a magnetic read head in which the physical and the magnetic read gaps have essentially the same value.

Another object of at least one embodiment of the present invention has been to reduce side reading in the lead overlap region, particularly for narrow track widths.

Still another object of at least one embodiment of the present invention has been to reduce misalignment between the lead overlay mask and the hard bias plugs mask.

A further object of at least one embodiment of the present invention has been to provide a process for manufacturing said device based on conventional bottom spin valve and contiguous hard bias manufacturing techniques.

These objects have been achieved by inserting an additional antiferromagnetic layer between the hard bias plugs and the overlaid leads. This additional antiferromagnetic layer and the lead layer are etched in the same operation to define the read gap, eliminating the possibility of misalignment between them. The extra antiferromagnetic layer is also longitudinally biased so there is no falloff in bias strength before the edge of the gap is reached. A process for manufacturing the device is also described.

BRIEF DESCRIPTION OF THE DRAWINGS

FIG. 1 shows the upper portion of a bottom spin valve, including overlaid leads, as is typical of the prior art.

FIG. 2 illustrates how the device of FIG. 1 may be improved to provide narrower read width.

FIG. 3 is an alternative embodiment of the device shown in FIG. 2.

DESCRIPTION OF THE PREFERRED EMBODIMENTS

We note that once the hard bias field is below a critical value, the permeability of the free layer is adequate to conduct flux to the center of the device. Our approach to preventing additional side reading and to sharpen the microtrack profile has been to pin that part of the free layer that is directly under the lead overlay by the use an additional antiferromagnetic layer, shown as layer 21 in FIG. 2, providing exchange along the track width direction. The value of this extra pinning layer could be as low as 50–100 Oe to accomplish the microtrack profile sharpening although higher values of pinning could also be utilized. The exchange provided by antiferromagnetic layer 21 at track edges adds a uniform field onto the field generated by the hard bias plugs 16 in the lead overlap region, ensuring a stiff sensor until the intended active area of the sensor is reached. As can be seen, this has the effect of extending the dead zones 15b all the way to near the edges of the leads.

We note further that this design can be expected to alleviate some of the alignment tolerances associated with this type of design by allowing the use of hard bias plugs that are further apart than is possible with current art designs since the added antiferromagnet is self aligned to the leads and reduces the response of the sensor under the leads.

Referring now to FIG. 2, we begin a more detailed description of the process of the present invention. As this description unfolds, the structure of the present invention will also become apparent. The process begins with the provision of a bottom spin valve. Only topmost layer 11 is shown in the figure. As discussed earlier, this is an antiferromagnetic layer which is normally oriented by heating in a transverse (normal to the plane of the figure) magnetic field at a temperature that is at or above its blocking temperature or that produces a phase transition into an ordered antiferromagnet in the presence of a field. The blocking temperature is defined as the temperature at which exchange coupling between the antiferromagnet and the ferromagnet goes to zero. Our preferred materials for layer 11 have been any one of PtMn, NiMn, PtPdMn, PtCrMn, and NiFeMn, corresponding to a blocking temperature of between about 250 and 350° C., depending on the choice of antiferromagnet. The thickness of layer 11 would normally be between about 80 and 200 Angstroms, also depending on the choice of antiferromagnet. For these ordered phase antiferromagnets, typical anneal temperatures range from 220 to 300° C.

As seen in FIG. 2, layer 11 has ben shaped (using ion milling) so that it has two opposing sides 25 that slope downwards away from central horizontal area 24. Following conventional procedures, plugs 16 of magnetic hard bias material are formed on sloping sides 25. Plugs 16 are patterned so that they are separated by gap 13 ( between about 0.15 and 0.5 microns wide), as seen in FIG. 1. Next, capping layer 17 is deposited and then patterned so as to be limited to central area 24.

Now follows a key novel feature of the invention. This is the deposition onto hard bias plugs 16 and capping layer 17 of additional antiferromagnetic layer 21. Layer 21 has a thickness between about 40 and 200 Angstroms and can be composed of material such as IrMn, FeMn, RuRhMn, or RhMn, which materials have a blocking temperature that is less than that of layer 11 (typically between about 180 and 250° C.). Alternatively layer 21 may be made of the same, or similar, material as layer 11, as will be discussed in more detail below.

The last layer to be deposited is conductive lead layer 12. Layers 12 and 21 are then treated as a single laminate and patterned together to form gap 28. Because of the presence of layer 21 directly below the lead layer, the longitudinal bias provided by plugs 16 extends without attenuation right up to the edges of gap 28 (see dead zones 15b). In this way the physical and magnetic widths of the device are essentially identical.

Referring now to FIG. 3, we show there an alternative embodiment of the invention, in which an additional layer, ferromagnetic layer 31 is introduced. This layer is typically between about 10 and 100 Angstroms thick and may be made of any of several soft magnetic materials such as NiFe, Co, CoFe, Ni, or Fe. Its purpose is to provide improved exchange coupling between layers 15 and 21.

Finally, the necessary annealing steps that must be taken to ensure correct magnetic orientations of layers 11 and 21. For the first case mentioned earlier (layer 11 has a higher blocking temperature than layer 21) the structure is first heated at a temperature between about 220 and 300° C. for between about 1 and 10 hours in a magnetic field of between about 2 and 10 kOe, appropriately oriented, followed by heating at a temperature between about 180 and 250° C. for between about 0.5 and 5 hours in a magnetic field of between about 0.5 and 10 kOe (again appropriately oriented).

For the second case mentioned above (layers 11 and 21 have similar blocking temperatures), a proper annealing sequence can be utilized to achieve transverse orientation for layer 11 and longitudinal orientation for layer 21. In this sequence, layer 21 is annealed into an ordered phase at a temperature lower than the blocking temperature of layer 11. For example, the structure is first heated at a temperature between about 220 and 300° C. for between about 60 and 600 minutes in a transverse magnetic field of between about 2,500 and 10,000 Oe followed by heating at a temperature between about 180 and 250° C. for between about 30 and 300 minutes in a longitudinal magnetic field of between about 500 and 10,000 Oe.

We conclude by noting that the device described above may be fabricated using conventional bottom spin valve and contiguous hard bias processes. Among the advantages of this design are the reduction of side reading in the lead overlap region which is a potential problem for narrow track widths. It also will serve to reduce the tolerances associated with the actual size of the GMR device and the misalignment between the lead overlay mask and hard bias plugs mask. We also note that the patterning of the antiferromagnetic and lead layers can be accomplished by liftoff or by full film deposition followed by patterned etching.

What is claimed is:

1. A magnetic read head, comprising:
   a bottom spin valve, whose topmost layer is a first antiferromagnetic layer, having two opposing sides that slope downwards away from a central horizontal area;
   on said sloping sides, two opposing plugs of magnetic hard bias material separated by a first gap;
   in said central area, on said first antiferromagnetic layer, a capping layer;
   on said hard bias plugs and said capping layer, a laminate of a conductive lead layer on a second antiferromagnetic layer; and
   a second gap, in said laminate, centrally located over said central area, said second gap being narrower than said first gap.

2. The read head described in claim 1 wherein said first antiferromagnetic layer is selected from the group consisting of PtMn, NiMn, PtPdMn, PtCrMn, and NiFeMn.

3. The read head described in claim 1 wherein said first antiferromagnetic layer has a thickness between about 40 and 200 Angstroms.

4. The read head described in claim 1 wherein said second antiferromagnetic layer is selected from the group consisting of IrMn, FeMn, RuRhMn, and RhMn.

5. The read head described in claim 1 wherein said first and second antiferromagnetic layers are selected from the group consisting of PtMn, NiMn, PtPdMn, PtCrMn, and NiFeMn.

6. The read head described in claim 1 wherein said second antiferromagnetic layer has a thickness between about 40 and 200 Angstroms.

7. The read head described in claim 1 wherein said first gap is between about 0.15 and 0.5 microns.

8. The read head described in claim 1 wherein said second gap is between about 0.02 and 0.2 microns.

9. A magnetic read head, comprising:
   a bottom spin valve, whose topmost layer is a first antiferromagnetic layer, having two opposing sides that slope downwards away from a central horizontal area;
   on said sloping sides, two opposing plugs of magnetic hard bias material separated by a first gap;
   in said central area, on said first antiferromagnetic layer, a capping layer;
   on said hard bias plugs, a layer of ferromagnetic material;
   on said layer of ferromagnetic material and said capping layer, a laminate of a conductive lead layer on a second antiferromagnetic layer; and
   a second gap, in said laminate, centrally located over said central area, said second gap being narrower than said first gap.

10. The read head described in claim 9 wherein said ferromagnetic layer is selected from the group consisting of NiFe, Co, CoFe, Ni, and Fe.

11. The read head described in claim 9 wherein said ferromagnetic layer has a thickness between about 10 and 100 Angstroms.

* * * * *